US006622287B1

(12) United States Patent
Henkel

(10) Patent No.: US 6,622,287 B1
(45) Date of Patent: Sep. 16, 2003

(54) LOW POWER HARDWARE/SOFTWARE PARTITIONING APPROACH FOR CORE-BASED EMBEDDED SYSTEMS

(75) Inventor: Joerg Henkel, Plainsboro, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/521,658

(22) Filed: Mar. 8, 2000

(51) Int. Cl.[7] .............................................. G06F 17/50
(52) U.S. Cl. ................................. 716/2; 716/17; 716/18
(58) Field of Search .......................... 345/212; 348/571; 702/13; 708/706; 709/221, 108; 712/4, 28, 34, 40; 713/1, 321, 322, 324; 717/4, 11; 716/2, 11, 14, 17, 18

(56) References Cited

U.S. PATENT DOCUMENTS 5,719,800 A * 2/1998 Mittal et al. ................ 713/321
6,223,274 B1 * 4/2001 Catthoor et al. ............. 712/34

OTHER PUBLICATIONS

Henkel, J., A methodology for minimizing power dissipation of embedded systems through hardware/software partitioning, VLSI, 1999. Proceedings. Ninth Great Lakes Symposium on , 1999 pp.: 86–89, Mar. 4–6, 1999.*
*0.07 Micron CMOS Technology Ushers In Era of Gigahertz DSP and Analog Performance*, Texas Instruments, Published on the Internet, http://www.ti.com/sc/docs/news/1998/98079.htm, 1998.
R.K. Gupta, Y Zorian, *Introducing Core–Based System Design*, IEEE Design & Test of Computers Magazine, vol. 13, No. 4, pp. 15–25, 1997.

F. Vahid, D.D. Gajski, J. Gong, *A Binary–Constraint Search Algorithm for Minimizing Hardware during Hardware/Software Partitioning*, IEEE/ACM Proc. of The European Conference on Design Automation (EuroDAC) 1994, pp. 214–219, 1994.
R.K. Gupta and GD. Micheli, *System–level Synthesis using Re–programmable Components*, IEEE/ACM Proc. of EDAC'92, IEEE Comp. Soc. Press, pp. 2–7, 1992.
Z. Peng, K. Kuchcinski, *An Algorithm for Partitioning of Application Specific System*, IEEE/ACM Proc. of The European Conference on Design Automation (EuroDAC) 1993, pp. 316–321, 1993.
T. Y. Yen, W. Wolf, *Multiple–Process Behavioral Synthesis for Mixed Hardware–Software Systems*, IEEE/ACM Proc. of 8th. International Symposium on System Synthesis, pp. 4–9, 1995.
A. Kalavade, E. Lee, *A Global Critically/Local Phase Driven Algorithm for the Constraint Hardware/Software Partitioning Problem*, Proc. of 3rd. IEEE Int. Workshop on Hardware/Software Codesign, pp. 42–48, 1994.

(List continued on next page.)

Primary Examiner—Leigh M. Garbowski
Assistant Examiner—Naum Levin
(74) Attorney, Agent, or Firm—Sughrue Mion, PLLC

(57) ABSTRACT

A novel power minimizing hardware/software co-design approach is presented that partitions an embedded application into an application specific core and a software program that executes on a microprocessor core. As opposed to prior art approaches, the present approach is very comprehensive since it takes into consideration a whole embedded system. In addition, it partitions at the cost of a very small additional hardware effort. The experimental results show high energy savings while maintaining (or even slightly increasing) the performance of the initial design.

6 Claims, 5 Drawing Sheets

OTHER PUBLICATIONS

W. Wolf, *Hardware–Software Co–Design of Embedded Systems*, Proc. of the IEEE, vol. 82, No. 7, pp. 967–989, Jul. 1994.

V. Tiwari, S. Malik, A. Wolfe, Instruction Level Power Analysis and Optimization of Software, Kluwer Academic Publishers, Journal of VLSI Signal Processing, pp. 1–8, 1996.

Ch. Ta Hsieh, M. Pedram, G. Mehta, F.Rastgar, *Profile–Driven Program Synthesis for Evaluation of System Power Dissipation*, IEEE Proc. of 34th. Design Automation Conference (DAC97), pp. 576–581, 1997.

P. Landman and J. Rabaey, Architectural Power Analysis: The Dual Bit Type Method, *IEEE Transactions on VLSI Systems*, vol. 3, No. 2, Jun. 1995.

P.–W. Ong, R.–H. Ynn, *Power–Conscious Software Design—a framework for modeling software on hardware*, IEEE Proc. of Symposium on Low Power Electronics, pp. 36–37, 1994.

P.–W. Ong, R.–H. Ynn, *Power–Conscious Software Design—a framework for modeling software on hardware*, IEEE Proc. of Symposium on Low Power Electronics, pp. 36–37, 1994.

T. Sato, M. Nagamatsu, H. Tago, *Power and Performance Simulator: ESP and its Application for 100 MIPS/W Class RISC Design*, IEEE Proc. of Symposium on Low Power Electronics, pp. 46–47, 1994.

B P. Dave, G. Lakshminarayana, N.K. Iha, COSYN: *Hardware–Software Co–Synthesis of Embedded Systems'* IEEE Proc. of 34th Design Automation Conference (DAC97), pp. 703–708, 1997.

I. Hong, D. Kirovski et al., *Power Optimization of Variable Voltage Core–Based Systems*, IEEE Proc, of $35^{th}$ Design Automation Conference (DAC98), pp. 176–181, 1998.

M.B. Kamble, K. Ghose, *Analytical Energy Dissipation Models For Low Power Caches*, IEEE Proc. of Symposium on Low Power Electronics and Design, pp. 143–148, 1997.

K. Itoh, K. Sasaki and Y. Nakagome, *Trends in Low–Power RAM Circuit Technologies*, Proceedings of the IEEE, vol. 83, No. 4, Apr. 1995.

* cited by examiner

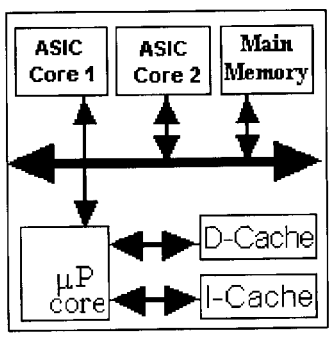
Fig. 1a)

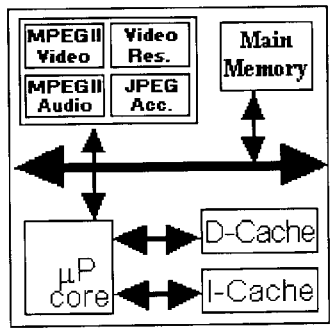
Fig. 1b)

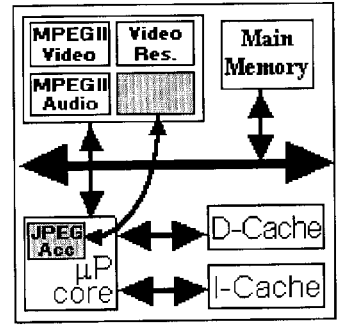
Fig. 1c)

The Low Power Partition Process

1) Build a graph G = {V,E}
2) C = decompose_into_cluster({V,E})
3) For All cluster $c_i \in C\, E_{\mu P}^{core}$
4) calculate $E_{Trans,\mu Pcore \leftrightarrow ASICcore}^{ci}$
5) C = pre - select(C, $N_{max}^{ci}$)
6) For All cluster $c_i \in C$
7)    For All $rs_i \in RS$
8)       do_list_schedule($c_i$,$rs_i$)
9)       If ($U_R^{core} > U_{\mu P}^{core}$)
10)       Then
11)          $E_R^{core} = E_R^{core} \cdot \sum_{rsi \in} (P_{av}^{rsi} \cdot N_{cyc}^{rsi} \cdot T_{cyc}^{rsi})$
12)          $E_{\mu P}^{core} = E_{\mu P,initial}^{core} - E_{\mu P,ci}^{core}$
13)       objective_function= $F \cdot \dfrac{E_R^{core} + E_{\mu P}^{core}}{E_0} + \dfrac{GEQ_{RS}}{GEQ_0}$
14) Synthesize a core with a minimum objective_function
15) Perform gate-level energy estimation and compute actual energy savings

Fig. 2

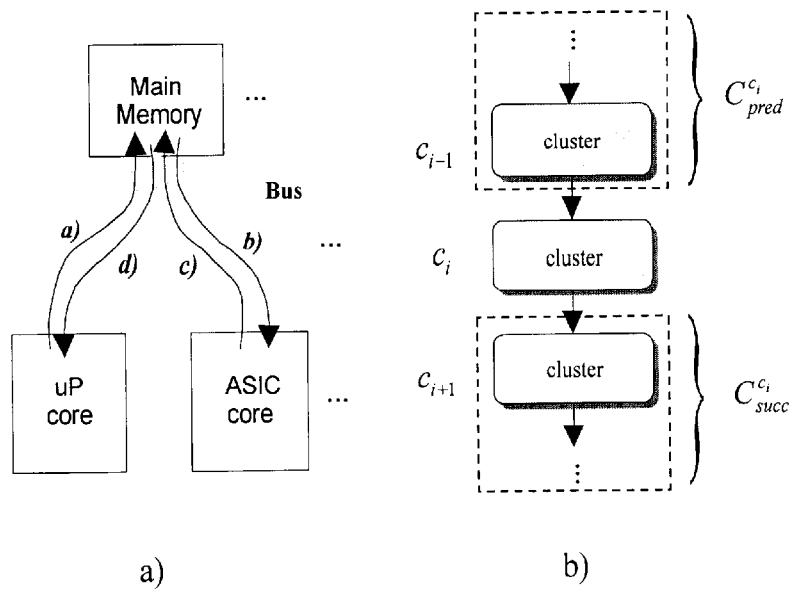

Computing energy related to bus transfer

1) Number of bus transfers between µP core and memory
$$N^{ci}_{Trans,\mu Pcore \to mem} = \left| gen\left[C^{ci}_{pred}\right] \cap use[c_i] \right|$$

2) Take into consideration synergetic effects:
   If
            (*implemented_in_ASIC_core*($c_{i-1}$))
   Then
   a) $N^{ci}_{Trans,\mu Pcore \to mem} = N^{ci}_{Trans,\mu Pcore \to mem} - \left| gen[c_{i-1}] \cap use[c_i] \right|$ 3) Number of bus transfers between ASIC core and memory
$$N^{ci}_{Trans,ASICcore \to mem} = \left| gen[c_i] \cap use\left[C^{ci}_{succ}\right] \right|$$

4) Take into consideration synergetic effects:
   If
            (*implemented_in_ASIC_core*($c_{i+1}$))
   Then
   a) $N^{ci}_{Trans,ASICcore \to mem} = N^{ci}_{Trans,ASICcore \to mem} - \left| gen[c_i] \cap use[c_{i+1}] \right|$ 5) Total energy:
$$E^{ci}_{Trans,\mu Pcore \to ASICcore} = (N^{ci}_{Trans,\mu Pcore \to mem} + N^{ci}_{Trans,ASICcore \to mem}) \times E_{bus.read/write}$$

Fig. 4

Computing $U_R^{core}$ and GEQ$_{RS}$

1) Initialize *Glob_RS_List*[ ][ ][ ]
2) For All cs$_i$ ∈ CS
3)    Initialize *Loc_RS_List*[ ][ ]
4)      For All o$_{i,c}$ ∈ O$_c$
5)         Build up *Sorted_RS_List*[ ]
6)         rs$_\pi$ := *Sorted_RS_List*[0]
7)         For All elements ∈ *Sorted_RS_List*[ ]
8)            rs$_\pi$ := current resource type of *Sorted_RS_List*[ ]
9)            If
10)              #$(rs_\pi)_{rs_\pi}$ ∈ Glob_RS_List[csi][...][...] > #$(rs_\pi)_{rs_\pi}$ ∈ Loc_RS_List [...][...]
11)            Then
12)              Update #(rs$_\pi$) in *Loc_RS_List*[rs$_\pi$][ ]
13)              continue with 4)
14)         Update #(rs$_\pi$) in *Loc_RS_List*[rs$_\pi$][ ]
15)     Update *Glob_RS_List*[cs$_i$][...][...] with *Loc_RS_List*[...][...]
16) Initialize GEQ$_{RS}$
17) For All rs$_\pi$ ∈ *Glob_RS_List*[...][...][...]
18)    GEQ$_{RS}$ := GEQ$_{RS}$ + #(rs$_\pi$) × GEQ(rs$_\pi$)
19) For All cs$_i$ ∈ CS
20)    For All rs$_i$ ∈ RS
21)       For All *instances*
22)          If (*Glob_RS_List*[cs$_i$][rs$_i$][*instances*]==1)
23)          Then (util[rs$_i$][ *instances*] = util[rs$_i$][*instances*] + #exec_cycles)
24) $U_R^{core} = \frac{1}{N_{cyc}^c} \cdot \sum_{rs_i \in RS} (\frac{1}{N_{instnaces}} \cdot \sum_{ins\tan ces}) u_r[rs_i][ins\tan ces]$

Fig. 5

| App. | | | Energy | | | | | | Exec. Time (cycles) | | | |
|---|---|---|---|---|---|---|---|---|---|---|---|---|
| | | | I-cache | d-cache | mem | µP core | ASIC core | total | Sav% | µP core | ASIC core | total | Sav% |
| 3d | I | 116.93 µJ | 14.2 µJ | 29.71 µJ | 566.78 µJ | n/a | 727.68 µJ | -35.21% | 39,712 | n/a | 39,712 | -17.29% |
| | P | 0.2627 µJ | 0.1227 µJ | 0.2626 µJ | 0.4705 µJ | 0.3078 µJ | 471.46 µJ | | 32,689 | 154 | 32,843 | |
| MPG | I | 44.79 µJ | 17.98 µJ | 2.305 µJ | 74.32 µJ | n/a | 140.92 µJ | -43.20% | 5,167,958 | n/a | 5,167,958 | -52.90% |
| | P | 35.36 µJ | 13.14 µJ | 2.941 µJ | 27.14 µJ | 1.462 µJ | 80.04 µJ | | 1,696,771 | 737,154 | 2,433,925 | |
| ckey | I | 0.0 | 0.0 | 0.0 | 329.99 µJ | n/a | 329.99 µJ | -76.81% | 169,511,655 | n/a | 169,511,665 | -74.98% |
| | P | 0.0 | 0.0 | 0.0 | 53.042 µJ | 23.468 µJ | 76.51 µJ | | 30,258,256 | 12,144,420 | 42,402,676 | |
| digs | I | 11.69 µJ | 5.123 µJ | 0.493 µJ | 52.7 µJ | n/a | 70.00 µJ | -94.12% | 3,706,291 | n/a | 3,706,291 | -42.64% |
| | P | 14.27 µJ | 2.039 µJ | 20.43 µJ | 46.78 µJ | 4.03 µJ | 4.11 µJ | | 6,347 | 2,119,750 | 2,126,097 | |
| engine | I | 117.55 µJ | 30.50 µJ | 33.77 µJ | 270.10 µJ | n/a | 454.92 µJ | -31.27% | 68,534 | n/a | 68,534 | -24.26% |
| | P | 84.90 µJ | 26.62 µJ | 21.89 µJ | 167.86 µJ | 1.408 µJ | 312.68 µJ | | 51,311 | 599 | 51,910 | |
| trick | I | 5.58 µJ | 410.40 µJ | 264.91 µJ | 18.54 µJ | n/a | 24.79 µJ | -94.79% | 1,489,000 | n/a | 1,489,000 | +69.64% |
| | P | 12.59 µJ | 3.677 µJ | 71.7 µJ | 181.01 µJ | 1.023 µJ | 1291.98 µJ | | 11,658 | 2,514,300 | 2,525,958 | |

Fig. 7

LOW POWER HARDWARE/SOFTWARE PARTITIONING APPROACH FOR CORE-BASED EMBEDDED SYSTEMS

BACKGROUND OF THE INVENTION

1. Field of the Invention

The present invention relates generally to the optimization of mixed hardware/software systems. More specifically, the invention is directed to optimizing a system to minimize power consumption, in systems where power usage is important, such as mobile computing systems, for example.

2. Description of the Related Art

Minimizing power dissipation of embedded systems is a crucial task. One reason is that high power dissipation may destroy integrated circuits through overheating. Another reason is that mobile computing devices (like cell phones, PDAs, digital cameras, etc.) draw their current from batteries, thus limiting the amount of energy that can be dissipated between two re-charging phases. Hence, minimizing the power dissipation of those systems means to increase the devices' "mobility", an important factor for a purchase decision of such device. Due to cost and power reduction, most of those systems are integrated onto one single chip (SOC: System-On-a-Chip). This is possible through today's feature sizes of $0.18\mu$ (and smaller) that allows for integration of more than 100 Mio. transistors on a single chip. (It is noted that due to the design gap, as discussed in M. Keaton and P. Bricaud, Reuse Methodology Manual For System-On-A-Chip Designs, Kluwer Academic Publishers, 1998, current systems on a chip hardly exceed 10 Mio. transistors (not counting on-chip memory)). By 2001, even larger systems, of up to 400 Mio transistors, may be integrated onto a single chip. See 0.07 Micron CMOS Technology Ushers In Era of Gigahertz DSP and Analog Performance, Texas Instruments, Published on the Internet, http://www.ti.com/sc/docs/news/1998/98079.htm, 1998. In order to cope with this complexity, state-of-the-art design methodology deployed is core-based system design: the designer composes a system of cores, i.e. system components like, for example, an MPEG encoder engine, a standard off-the-shelf processor core microprocessor core, peripherals etc., as seen in FIG. 1b). See, for example, M. Keaton and P. Bricaud, cited above. But still, the designer has a high degree of freedom to optimize her/his design according to the related design constraints, since cores are available in different forms: as "hard", "firm" or "soft" versions. For a more detailed introduction to core-based design, please refer to R. K. Gupta, Y Zorian, Introducing Core-Based System Design, IEEE Design & Test of Computers Magazine, Vol. 13, No. 4, pp. 15–25, 1997. In the case of a hard core, all design steps down to layout and routing have already been completed, and a soft core is highly flexible since it is a structural or even behavioral description of the core's functionality. Hence, after purchasing a soft core in behavioral description, the designer may still decide whether to implement the core's functionality completely as a software program (running on a standard off-the-shelf processor core) or as a hard-wired hardware (ASIC core). Or, the designer may partition the core's functionality between those (hardware and software) parts. As an example, FIG. 1b) shows a system-on-a-chip with an MPEG encoder core composed of blocks like MPEG video, MPEG audio, Video Res., JPEG Acc. Under certain circumstances there might be a possibility that in terms of power dissipation of the whole system, a different hardware/software partitioning is more advantageous. Parts of these MPEG encoder engines might be run on the $\mu$P core as shown in FIG. 1c).

SUMMARY OF THE INVENTION

The present invention employs a novel approach that deploys a hardware/software partitioning methodology to minimize the power consumption of a whole system (standard off-the-shelf processor core and instruction cache and data cache and main memory and application specific cores (ASIC cores) like, for example, MPEG, FFT etc.). The present invention focuses on the low power hardware/software partitioning method and uses a framework to estimate and optimize the power consumption of the other cores that are not subject to hardware/software partitioning (like main memory, caches, etc.). It is noted that those other cores have to be adapted efficiently (e.g. size of memory, size of caches, cache policy etc.) according to the particular hardware/software partitioning chosen. This is because, in case of the cache, the access patterns may change when a different hardware/software partition is used. Hence, power consumption is likely to differ.

The present invention is a totally new approach to reduce the power consumption of a system. This reduction is performed by adding hardware, such that this additional hardware is executing in mutual exclusion with the software parts that it replaces. As such, the part that is not executing can be shut down entirely and thus is not consuming energy. Also, the additional hardware is especially adapted for the specific calculations, thus it achieves a better resource utilization rate. Lastly, the additional hardware can work faster (i.e. require fewer clock cycles) and thus allow for even greater savings of energy.

According to the invention, a method of optimizing a system for power usage, where the system has a set of cores, with each of the cores having a plurality of functional units. The method includes calculating a utilization rate of each of the functional units and each of the cores, where the utilization rate of the functional units is defined as a number of clock cycles the functional unit is actually performing an operation in relationship to all clock cycles this functional unit is switched on, and the utilization rate of each of the cores is defined as the average utilization rate of all of the functional units; selecting cores from the set of cores that have a low utilization rate and dividing functions of those selected cores into partitioning objects; executing the partitioning objects and calculating utilization rates for the executed partitioning objects; comparing the utilization rates of the partitioning objects with the utilization rates of the selected cores from which the partitioning objects were extracted; synthesizing the partitioning objects for which the utilization rates of the partitioning objects is lower than the utilization rates of the selected cores from which the partitioning objects were extracted, where the synthesized partitioning objects represent new cores to be added to the system as small ASICs; and building the system using the new cores and some of the cores from the set of cores. As used herein, partitioning objects are software pieces, such as nested loops, etc., that can be executed separately, and their individual utilization rates may be compared to the utilization rate of the undivided core.

In a preferred embodiment, the method also comprises a step of determining the functional units of the cores by examining code segments that make up a set of operations of the cores. Further, the functional units may be preselecting some of the functional units that are expected to yield energy savings based on bus transfers between a main memory of the system and cores corresponding to some of the functional units.

The method takes into consideration all of said cores, caches and a main memory of said system to minimize power usage of the entire system.

The new cores in the built system are executed in mutual exclusion of the selected cores from which the new cores were extracted. Additionally, the system is optimized for energy savings (through adapted synthesis) while maintaining or increasing the performance of the system as compared to an initial, unoptimized design of the system.

In addition, a method of hardware/software partitioning of a system for low power usage having a plurality of cores is also disclosed. The method includes: determining a plurality of instruction-level functional units taken from the plurality of cores; calculating a utilization rate of each of the functional units and each of the cores, where the utilization rate of each of the cores is defined as the average utilization rate of all of the functional units; and adding additional hardware components to the system to replace certain functional units of the plurality of functional units such that an overall utilization rate of the system is minimized.

The above method may also have the additional hardware components executing in mutual exclusion with the replaced functional units, such that the replaced functional units can be shut down and not consume energy. Additionally, the additional hardware components may be especially adapted to specific calculations to achieve the minimization of the overall utilization rate of the system. Also, the additional hardware components may use fewer clock cycles than the replaced certain functional units, thus providing for additional energy savings.

BRIEF DESCRIPTION OF THE DRAWINGS

FIG. 1 illustrates generic target architecture a) and examples of different partitions for specific examples b) and c).

FIG. 2 provides sample pseudo code of the partitioning algorithm.

FIG. 3 illustrates bus transfer, shown in a) and conventions for nomenclature of the clustering algorithm, shown in b).

FIG. 4 provides pseudo code for the algorithm to calculate energy of bus-transfer, in order to determine the pre-selection of cluster.

FIG. 5 provides pseudo code of the algorithm to compute the utilization rate $U_R^{core}$ and the hardware effort $GEQ_{RS}$ of a cluster.

FIG. 7 shows the results in terms of energy dissipation and execution time for both the initial (I) and partitioned (P) designs.

DETAILED DESCRIPTION OF THE PREFERRED EMBODIMENTS

Figure 6:
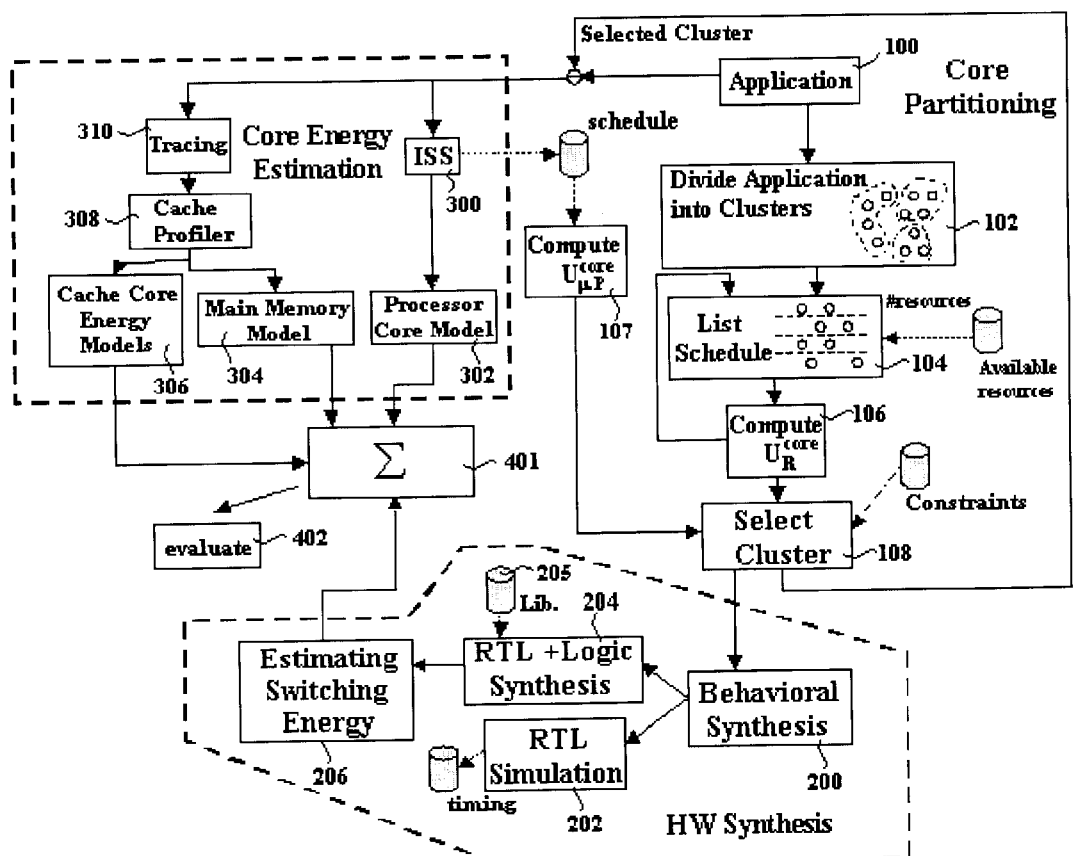
FIG. 6 illustrates the design flow of the low-power hardware/software partitioning methodology.
Figure 8:
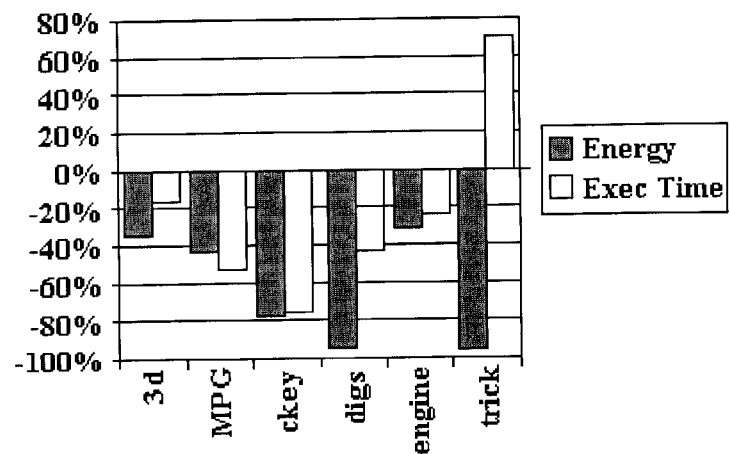
FIG. 8 illustrates the results achieved in energy savings and in the change of total execution time.

Hardware/software partitioning is a well-established design methodology in order to increase the performance of a system as described in many different approaches. See, F. Vahid, D. D. Gajski, J. Gong, A Binary-Constraint Search Algorithm for Minimizing Hardware during Hardware/Software Partitioning, IEEE/ACM Proc. of The European Conference on Design Automation (EuroDAC) 1994, pp. 214–219, 1994; R. K. Gupta and G D. Micheli, System-level Synthesis using Re-programmable Components, IEEE/ACM Proc. of EDAC'92, IEEE Comp. Soc. Press, pp. 2–7, 1992; Z. Peng, K. Kuchcinski, An Algorithm for Partitioning of Application Specific System, IEEE/ACM Proc. of The European Conference on Design Automation (EuroDAC) 1993, pp. 316–321, 1993; J. Madsen, P. V. Knudsen, LYCOS Tutorial, Handouts from Eurochip course on Hardware/Software Codesign, Denmark, 14–18. Aug. 1995; T. Y. Yen, W. Wolf, Multiple-Process Behavioral Synthesis for Mixed Hardware-Software Systems, IEEE/ACM Proc. of 8th. International Symposium on System Synthesis, pp. 4–9, 1995; A. Kalavade, E. Lee, A Global Critically/Local Phase Driven Algorithm for the Constraint Hardware/Software Partitioning Problem, Proc. of 3rd. IEEE Int. Workshop on Hardware/Software Codesign, pp. 42–48, 1994.

These and many other approaches have as an objective to meet performance constraints while keeping the system cost (e.g. total chip area) as low as possible. See, W. Wolf, Hardware-Software Co-Design of Embedded Systems, Proc. of the IEEE, Vol. 82, No. 7, pp. 967–989, July 1994. But none of them provide power related optimization and estimation strategies.

Power optimization of software programs through analysis of energy dissipation during the execution of single instructions has been conducted, as described in V. Tiwari, S. Malik, A. Wolfe, Instruction Level Power Analysis and Optimization of Software, Kluwer Academic Publishers, Journal of VLSI Signal Processing, pp. 1–18, 1996. These basic investigations and results the foundations of the present invention. Power dissipation of high-performance microprocessors has been investigated and specific software synthesis algorithms have been derived to minimize for low power. Ch.Ta Hsieh, M. Pedram, G. Mehta, F.Rastgar, Profile-Driven Program Synthesis for Evaluation of System Power Dissipation, IEEE Proc. of 34th. Design Automation Conference (DAC97), pp. 576–581, 1997. Another architectural power analysis study has been conducted by Burd et al. who investigated a MIPS R3000 architecture. See T. Burd, B. Peters, A Power Analysis of a Microprocessor. A Study of an Implementation of the MIPS R3000 Architecture, Technical Report, University of California at Berkeley, May 1994. In addition, P. Landman and J. Rabaey, Architectural Power Analysis: The Dual Bit Type Method, IEEE Transactions on VLSI Systems, Vol. 3, No. 2, June 1995, deals with an architectural-oriented power minimization approach.

Algorithmic related power investigations and optimizations have been published by Ong et al., who showed that the power dissipation may drastically depend on the algorithm deployed for a specific functionality. See, P.-W. Ong, R.-H. Ynn, Power-Conscious Software Design—a framework for modeling software on hardware, IEEE Proc. of Symposium on Low Power Electronics, pp. 36–37, 1994. A power and performance simulation tool, that can be used to conduct architectural-level optimizations, has been introduced by Sato et al. See, T. Sato, M. Nagamatsu, H. Tago, Power and Performance Simulator: ESP and its Application for 100 MIPSIW Class RISC Design, IEEE Proc. of Symposium on Low Power Electronics, pp. 46–47, 1994.

A task-level co-design methodology has been introduced that optimizes for power dissipation and performance. B. P. Dave, G. Lakshminarayana, N. K. Iha, COSYN: Hardware-Software Co-Synthesis of Embedded Systems' IEEE Proc. of 34th Design Automation Conference (DAC97), pp.

703–708, 1997. The influence of caches is not taken into consideration in the above reference. Furthermore, the procedure for task allocation is based on estimations for an average power dissipation of an processing element rather than assuming, for example, data-dependent power dissipation that may vary from clock cycle to clock cycle. The approach uses a multiple-voltage power supply to minimize system-power dissipation. See, I. Hong, D. Kirovski et al., Power Optimization of Variable Voltage Core-Based Systems, IEEE Proc. of 35th Design Automation Conference (DAC98), pp. 176–181, 1998. Other power optimization/estimation approaches that are prominent are for software power estimation, for caches and for on-chip RAMs. See, as examples, V. Tiwari, S. Malik, A. Wolfe, Instruction Level Power Analysis and Optimization of Software, Kluwer Academic Publishers, Journal of VLSI Signal Processing, pp. 1–18, 1996; S. J. E Wilton, N. P. Jouppi, An Enhanced Access and Cycle Time Modelfor On-Chip Caches, DEC, WRL Research Report 93/5, July 1994; M. B. Kamble, K. Ghose, Analytical Energy Dissipation Models For Low Power Caches, IEEE Proc. of Symposium on Low Power Electronics and Design, pp. 143–148, 1997; K. Itoh, K. Sasaki and Y. Nakagome, Trends in Low-Power RAM Circuit Technologies, Proceedings of the IEEE, VOL. 83, No. 4, April 1995.

The approach of the present invention is to employ a comprehensive system-level power optimization approach that deploys hardware/software partitioning based on a fine-grained (instruction/operation-level) power estimation analysis while yielding high energy savings between 35% to 94%.

Low Power Hardware/Software Partitioning Approach

The architecture of a system applicable to the methodology of the present invention is shown in FIG. 1a): it consists of one or more processor cores, a set of standard cores (main memory, caches etc.) and a set of application specific cores. But unlike in the system predetermined there, for the present application, the application specific cores are not yet defined. Also, the part of the system that is running as a program on the standard off-the-shelf processor core is not yet defined.

The goal is to partition a system application between a standard off-the-shelf processor core and the application specific core(s) in order to minimize the total power consumption.

Embodiment Exemplifying the Basic Idea of the Invention

During the execution of a program in a standard off-the-shelf processor core different hardware resources within this core are invoked according to the instruction executed at a specific point in time. Assume, for example, an add instruction is executed that invokes the resource ALU and Register. A multiply instruction uses the resources Multiplier and Register. A move instruction might only use the resource Register etc. These examples are for demonstration purposes only. Conversely, it can be argued that during the execution of the add instruction the multiplier is not used; during execution of the move instruction neither the ALU nor the Multiplier is used, etc. It is noted, however, this might not apply, in this simple form, to a particular processor. In case the processor does not feature the technique of "gated clocks" to shut down all non-used resources clock cycle per clock cycle, those non actively used resources will still consume energy since the according circuits continue to switch. This is actually the case for most today's processors deployed in embedded systems. An example is the LSI SPARCLite processor core. This can be shown by measuring the current that is drawn during the execution of an instruction that is executed. An add on a SPARCLite processor core, for example, draws in average 178 mA, an Id instruction draws 192 mA and a bicc branch instruction accounts for about 230 mA. Even a nop instruction (i.e. "no operation") draws a current between 100 mA and 200 mA. See, V. Tiwari, S. Malik, A. Wolfe, Instruction Level Power Analysis and Optimization of Software, Kluwer Academic Publishers, Journal of VLSI Signal Processing, pp. 1–8, 1996. Obviously, the current each instruction draws is composed of one part that is directly related to the execution of the instruction (in case of an add instruction stemming from the ALU) and an offset current that is due to all other resources within the processor that are actually not used but still consume energy.

The latter situation refers to "the circuits are not actively used". Accordingly, "the circuits are actively used" in the previous situations described. For each resource $rs_i$ of all resource RS within a core, a utilization rate is defined as follows:

$$u_{rs} = \frac{N^{rs}_{act\_used}}{N_{total}} \quad (1)$$

where $N_{act\_used}^{rs}$ is the number of cycles resource rs is actively used and $N_{total}$ is the number of all cycles it takes to execute the whole application. The "wasted energy" within a core, i.e. the energy that is consumed by resources during times frames where those resources are not actively used, is defined as $$E^{core}_{non\_act\_used} = \sum_{rs_i \in RS} (1 - u_{rs_i}) \cdot P^{rs_i}_{av} \cdot T_{app} \quad (2)$$

where $P_{av}^{rs_i}$ is the average power that is consumed by the particular resource and $T_{app}$ is the execution time of the whole application when executed entirely by this core. Minimizing the total energy consumption can be achieved by minimizing $E_{non\_act\_used}^{core}$. In the present invention, an additional core is deployed for that purpose, i.e. to partition the functionality that was formerly solely performed by the original core, to a new (to be specified) application specific core and in parts to run it on the initial core such that $$\sum_{i=1}^{N_{core}} \left( E^{core^i}_{non\_act\_used} + E^{core^i}_{act\_used} \right) \leq E^{initial\_core} \quad (3)$$

Whenever one of the cores $i, \ldots, N_{core}$ is performing, all the other cores are shut down (as far as they are not used, of course), thus consuming no energy. Equation 3 is most likely to be fulfilled when the individual resource utilization rate, defined as:

$$U_R^{core} = \frac{1}{N_R} \cdot \sum_{r=1}^{N_R} u_r, \quad (4)$$

of each core is as high as possible. It is noted that in the ideal case, it would be 1. The values $U_R^{core}$ of all participating cores (i.e. those that are subject to partitioning) are used to determine whether a partition of an application is advantageous in terms of power consumption or not.

At this point one could argue that it would be better to shut down the individual resources within each core rather than deploying additional cores to minimize energy. This is because it is supposed that a state-of-the-art core-based design techniques is used as described in the introduction. The designer's task is to compose a system of cores that the designer can buy from a vendor rather than modifying a complex standard off-the-shelf processor core.

The methodology of the present invention allows for use of core-based design techniques and minimizing energy consumption without modifying standard cores.

Whereas the instant embodiment was used to described basic idea of the invention in a general way, the following embodiments disclose partitioning algorithms specifically based on hardware/software partitioning between a standard off-the-shelf processor core and an application specific core (ASIC core).

The Partitioning Process

An overview of the low power partitioning approach is provided in coarse steps to better explain the invention. It is based on the idea that an application specific hardware (called ASIC core in the following discussion) can, under specific circumstances, achieve a higher utilization rate $U_R^{core}$ than a standard (programmable) processor core (in the following it is referred to as a standard off-the-shelf processor core), as demonstrated in the example above. The input to the process is a behavioral description of an application that is subject to hardware/software partitioning between the ASIC core and the standard off-the-shelf processor core. The following descriptions refer to the pseudo code shown in FIG. 2. It is noted that "{"and"}" is not used to indicate the scope of validity of an If statement or a loop. Rather the scope is indicated by aligning to the rows accordingly. Step 1) derives a graph G={V, E} from that description. There, V is the set of all nodes (representing operations) and E is the set of all edges connecting them.

Using this graph representation, step 2 performs a decomposition of G in so-called clusters. A cluster, as defined herein, is a set of operations which represents code segments like nested loops, if-then-else constructs, functions etc. The decomposition algorithm is not described here because it is not central to the present invention and such algorithms are known in the art. Decomposition is done by structural information of the initial behavioral description solely. An important reason why the implementation of a cluster on an ASIC core might lead to a reduction in energy consumption is given by the additional amount of (energy consuming) bus transfers. This is a very important issue for high-bus traffic, data-oriented applications that are the focus of the present invention. The calculation is done in lines 3 and 4. Due to the importance, a detailed section dedicated to that issue is included below. Line 5 performs a pre-selection of clusters, i.e. it preserves only those clusters for a possible partitioning that are expected to yield high energy savings based on the bus traffic calculation. Here, the designer has the possibility of interaction by specifying different constraints like, for example, the total number of clusters $N_{max}^c$ to be pre-selected. Please note that it is necessary to reduce the number of all clusters since the following steps 6 to 12 are performed for all remaining clusters.

In line 7 a loop is started for all sets of resources. A set of resources, RS, is specified by the designer. The designer tells the partitioning algorithm how much hardware (#ALUs, #multipliers, #shifters, . . . ,) he/she is willing to spend for the implementation of an ASIC core. The different sets specified are based on reference designs, i.e. similar designs from past projects. Due to the chosen design praxis, 3 to 5 sets are given, depending on the complexity of an application. Afterwards, in line 8, a list schedule is performed on the current cluster in order to prepare the following step.

That step is one major part of the present invention presented here: the computation of $U_R^{core}$ (line 9). It is tested whether a candidate cluster can yield a better utilization rate on an ASIC core or on a standard off-the-shelf processor core. Due to the complexity of calculating $U_R^{core}$, a detailed description is given below. In case a better utilization rate is possible, a rough estimation on expected energy savings is performed (lines 11 and 12). Note that the energy estimate of the ASIC core is based on the utilization rate. For each resource $rs_i$ of the whole sets of resources RS (as discussed above), an average power dissipation $P_{av}^{rsi}$ is assumed. $N_{cyc}^{rsi}$ is the number of cycles resource $rs_i$ is actively used whereas $T_{cyc}^{si}$ gives the minimum cycle time the resource can run. The energy consumed by the standard off-the-shelf processor core is obtained by using an instruction set energy simulation tool (that will be explained in more detail below). The objective function of the partitioning process is defined as a superposition of a normalized total energy consumption and an additional hardware effort one has to spend. Please note that $E_{rest}$ gives the energy consumption of all other components (instruction cache, data cache, main memory, bus). $GEQ_{RS}$ is the hardware effort of a deployed resource set. $E_0$ and $GEQ_0$ are provided for the purpose of normalization. Finally, F is a factor given by the designer to balance the objective function between energy consumption and hardware effort. F is heavily dependent on the design constraints as well as on the application itself. For the partition that yields the best value of the objective function steps 14 and 15 are executed: the synthesis and the following gate-level energy estimation. The last two steps are described during introduction of the whole design flow, and explained in greater detail below.

Determining Pre-Selection Criteria for Clusters

The pre-selection algorithm of clusters is based on an estimate for energy consumption of clusters due to the additional traffic via the bus architecture. When a hardware/software partition of an application between a standard off-the-shelf processor core and an ASIC core is deployed, the following additional bus traffic, based on the architecture shown in FIG. 3a) where two cores communicate via a shared memory, is implied:

a) When the standard off-the-shelf processor core arrives at a point where it "calls" the ASIC core, it is then depositing data or references to data in the memory such that it can be accessed by the ASIC core for subsequent use.

b) Once the ASIC core starts it's operation, it will access, i.e. download, the data or references to it from the memory.

c) After the ASIC core has finished it's job some data might be used by the standard off-the-shelf processor core to continue execution. Therefore the ASIC core is depositing the according data or references to it in the main memory.

d) Finally, the standard off-the-shelf processor core reads data back from the memory.

The amount of transfers described in b) and c) occur in any case, no matter whether there is a standard off-the-shelf processor core/ASIC core partitioning or not. Hence, those transfers are not taken into account in the following algorithm that is the calculation of an additional (i.e. due to partitioning only) energy effort that would have to be spent. Thus, the psuedo code in FIG. 4 shows an algorithm that calculates the necessary part of energy consumption due to partitioning.

The algorithm is based on the conventions shown in FIG. 3b). There, each node represents a cluster. The arrows indicate the direction of the control flow. The current cluster is denoted as $c_i$ whereas the previous one is drawn as $c_{i-1}$ and the succeeding one is given as $c_{i+1}$. Furthermore, $C_{pred}^{ci}$ is defined to represent all clusters preceding $c_i$. Similarly, $C_{succ}^{ci}$ combines all clusters succeeding $c_i$. Step 1) computes the number of all transfers from the standard off-the-shelf processor core to the memory. Apparently, that data has to be transferred that is generated in all clusters preceding the current one and that is used in the current cluster (i.e. that one that is supposed to be implemented on the ASIC core). The operators gen [ . . . ] and use [ . . . ] are used as defined in A. W. Aho, R. Sethi and J. D. Ullmann, COMPILERS Principles, Techniques and Tools, Bell Telephone Laboratories, 1987.

Step 2) tests whether the preceding cluster might probably be already part of the ASIC core. Then the actually necessary amount of data can be reduced accordingly since some data is already present within the registers of the ASIC core and a new transfer is superfluous. In this case, there is a "synergetic" effect in communication, arising when more than one of the clusters are implemented on the ASIC core, thus mutually favoring the communication effort of the other clusters. The explanation of the communication effort for the ASIC core to the memory in 3) and 4) follows the same principle. Finally, the total part of energy resulting from partitioning is calculated in 5) using an energy amount $E_{busread/write}$ for bus access. Please note that read and write operations imply different amounts of energy.

Determining the Utilization Rate

Now, since a scheduling has been performed, the computation of the resource utilization rate $U_R^{core}$ of a core can be performed. The following definitions hold: CS is the set of all control steps (result of schedule) and $cs_i$ is the denotation of one individual control step within CS. Furthermore, $O_c$ is the set of all operations within a cluster c whereas $o_{i,c}$ is an operation within $O_c$ that is scheduled into control step i. An operation can be mapped to one of the D resource types in RS={$rs_i$, . . . , $rs_D$}. Examples for a resource type are an ALU, a shifter, a multiplier etc. Please note that each type π of a resource rs—or short, $rs_\pi$—can have several instances. With these definitions, the algorithm in FIG. 5, that is given in pseudo code, can be discussed.

At the beginning, a global resource list, Glob_RS_List[ ][ ][ ], is defined. The first index indicates the control step $cs_i$, the second stands for the resource type $rs_\pi$) while the third is reserved for a specific instance of that resource type.

An entry can be either a "1" or a "0". For example, Glob_RS_List[34][5][2]=1 means that during control step 34 instance "2" of resource type "5" is used. Accordingly, "0" means that is not used. The coding of the existence of a module type is accomplished by providing or not providing an entry in Glob_RS_List[ ][ ][ ]. This is possible since the implementation of Glob_RS_List[ ][ ][ ] is a chained list. Line 2 starts a loop for all control steps $cs_i$ and in line 3, a local resource list Loc_RS_List[ ][ ] is initialized. It has the same structure as the global resource list except that it is used within one control step only. Line 4 starts a loop for all operators within a control step. A sorted resource list is defined in line 5. It contains all resources that could perform operator $o_{i,c}$. It is sorted according to the increasing size of a resource. This is for the computation of the hardware effort of the final core. An initial resource is selected in line 6. In the following lines 9 to 13, all possible resource types are tested whether they are instantiated in a previous control step. If this is true, that resource type is assigned to the current operator, a respective entry is made in the local resource list and a new operator is chosen. In the other case, the searching process through the local resource list continues until an already instantiated instance is found that is not used during the current control step. If the search does not succeed, the first resource is assigned to the current operator and an according entry is made (line 14). It is noted that the list is sorted, so that the first resource means the smallest and therefore the most energy efficient one. When all operators within a control step have been handled, the global resource list is enhanced by that many instances of a resource as indicated by the local resource list (15).

As a result, the global resource list contains the assignment of all operators to resources for all control steps. This information can be used to compute the respective hardware effort $GEQ_R^{core}$ in lines 16 to 18 where #($rs_\pi$ is the number of resources of type π and GEQ($rs_\pi$) is the hardware effort (i.e. gate equivalents) of an according resource type.

The computation of the utilization rate is performed in line 24. Before, in lines 19 to 23 a list is created that gives information about how often each instance of each resource is used within all control steps. Note that #exec_cycles× #exec_times is the number of cycles it takes to execute an operation on that resource multiplied by the number of times the according control step is actually invoked. Finally, $U_R^{core}$ is computed in line 24. Note that $N_{cyc}^c$ is the number of cycles it takes to execute the whole cluster. Thus $U_R^{core}$ was computed that gives the average utilization rate of all resources deployed within a possible core. As was shown in a previous section, $U_R^{core}$ is actually used to determine whether this might be good implementation of a core in terms of energy dissipation or not.

Also note that all resources contribute to $U_R^{core}$ in the same way, no matter whether they are large or small (i.e. that they actually dissipate more or less energy). This is because experiments have shown that an according distinction does not result in better partitions though the individual values of $U_R^{core}$ are different. The reason is that the relative values of $U_R^{core}$ of different clusters are actually responsible for deciding on a energy efficient partition.

Design Flow

The whole design flow of the low power hardware/software partitioning methodology of the present invention is introduced through FIG. 6. Please note that those parts that are surrounded by dashed lines are either a mixture of standard in-house and commercial tools (as it is the case for the block "HW Synthesis") or work that is already known in the art (as it is the case for "Core Energy Estimation").

The design flow starts with the box "Application" 100 where an application in a behavioral description is given. This might be a self-coded application or an Intellectual Property core purchased from a vendor. Then the application is divided 102 into clusters as described a prior section after an internal graph representation has been build up. Preferred clusters are pre-selected by criteria is described in a previous section. The next step is a list schedule 104 that is performed for each remaining cluster such that the utilization rate $U_R^{core}$, using the algorithm in last section, can be computed 106. Please note that the flow in FIG. 6 is simplified i.e., it does not feature all arcs representing the loops in the according algorithms. Those cluster(s) that yield a higher utilization rate compared to the implementation of a standard off-the-shelf processor core 107 and that yield the highest core of the objective function 108, are provided to the hardware synthesis flow. This is a behavioral compilation tool 200, an RTL simulator 202 to retrieve the number of cycles it needs to execute the cluster, an RTL logic synthesis tool 204 using a CMOS6 library 205 and finally the gate-level simulation tool 206 with attached switching energy calculation. In order to keep the FIG. 6 of the design flow as clear as possible, the inputs of input stimuli pattern at various points in the design flow are not illustrated. Note that these steps, especially the last one, are the most time-consuming ones. Hence, the partitioning algorithm has to reduce the umber of clusters to those that are most likely to gain an energy saving.

The other application parts that are intended to run on the standard off-the-shelf processor core are fed into the "Core Energy Estimation" block. An instruction set simulator tool (ISS) 300 is used in the next step. Attached to the ISS is the facility 302 to calculate the energy dissipation depending on the instruction executed at a point in time. The same methodology, as used in V. Tiwari, S. Malik, A. Wolfe, Instruction Level Power Analysis and Optimization of Software, Kluwer Academic Publishers, Journal of VLSI Signal Processing, pp. 1–8, 1996, is used. Analytical models for main memory energy dissipation 304 and caches 306 are fed with the output of a cache profiler 308 that itself is preceded by a trace tool 310 (M. D. Hill, J. R. Laurus, A. R. Lebeck et al., WARTS: Wisconsin Architectural Research Tool Set, Computer Science Department, University of Wisconsin).

Finally, the total energy dissipation is calculated 401 and it is tested whether the total system energy dissipation could be reduced or not 402. If "not" then the whole procedure can be repeated and the designer will make use of his/her interaction possibilities to put the algorithms into different directions where an improvement is more likely to be found. Please note that the designer does have manifold possibilities of interaction, such as defining several sets of resources, defining constraints like the total number of clusters to be selected or to modify the objective function according to the peculiarities of an application. The inventors are convinced that the designer's interactions are a precious asset to the algorithms employed in the present invention and that this is one reason for the high energy savings that are reported in the next section.

Conducted Experiments and Results

The experiments are based on an energy instruction simulation tool for a SPARCLite standard off-the-shelf processor core, analytical models for main memory, instruction cache and data cache based on parameters (feature sizes, capacitances) of a $0.8\mu$ CMOS process. All analytical models as well as the SPARCLite simulation tool are configured for usage as an on-chip implementation. This is important to note since otherwise the output driver capacitances would dominate. In such a case, the total energy dissipation would be higher. The experiments have been conducted using the design flow already described in the previous section. As apparent from the algorithms defined above, the methodology is aimed at computation and memory intensive DSP-oriented applications, as there has been a general need in the design of those applications (cell phones, digital cameras, settop boxes, . . . ). Thus, the following six applications were employed in the experiments to evaluate the methodology of the present invention. Short description of the applications are: an algorithm for computing 3D vectors of a motion picture ("3d"), an MPEGII encoder ("MPG"), a complex chroma-key algorithm ("ckey"), a smoothing algorithm for digital images ("digs"), an engine control algorithm ("engine") and a trick animation algorithm ("trick"). The applications range in size from about 5 kB to 230 kB of C code. Two rows are dedicated to each application: the initial (non-partitioned) "I" implementation and the partitioned "P" implementation. In each case, the contribution of each involved core in terms of energy dissipation is given in FIG. 7. It is a important feature of the present invention that all system components are taken into consideration to estimate energy savings. This is because a differently partitioned system might have different access patterns to caches and main memory, thus resulting in different energy dissipations of those cores (compare according rows of columns "i-cache", "d-cache" and "mem"). The sole energy estimation of the standard off-the-shelf processor core and the ASIC core would not be sufficient since the energy dissipation of the other cores changes in some cases drops dramatically as well (see for example the energy of the i-cache dissipated by the "trick" application that drops from 5.58 mJ to 12.59 $\mu$J). In one case ("ckey"), which was in fact one of the less memory-intensive ones, the contribution to total energy dissipation could be neglected.

The rightmost four columns give the execution time before and after the partitioning. This is of paramount importance: high energy savings are achieved, but not at the cost of performance (except for one case). Instead, energy savings are achieved at additional hardware costs for the ASIC core through the selective algorithms described in the previous sections. The largest (but still small) additional hardware effort accounted for slightly less than 16 k cells. But in that case ("digs") a large energy saving of about 94% could be achieved. Due to today's design constraints in embedded high-performance applications, a loss in performance through energy savings is, in the majority of cases, not accepted by designers. On the other side is a (low) additional hardware effort of 16 k cells and no real constraint since the state-of-the-art systems on a chip have about 10 Mio. transistors. Please note that due to the currently deployed technology of 0.18 $\mu$ an even higher transistor count would be possible. But due to the current "design gap" (therefore, see also M. Keaton and P. Bricaud, Reuse Methodology Manual For System-On-A-Chip Designs, Kluwer Academic Publishers, 1998, a maximum is currently about 10 Mio, transistors on a chip (not including main memory)).

FIG. 7 illustrates the results by giving the percentage of energy savings and the related changes in execution time of a specific application. As seen, high energy savings of between about 35% and 94% were achieved, while the decrease in execution time (i.e. faster) ranges between about 17% and 75%. It shows that optimization of the present invention is specially tailored for energy minimization and execution time is only a side effect. Note, hat the chosen algorithms could not find an appropriate cluster of the application "trick" yielding energy savings and a reduction of execution time. A closer investigation revealed that this application did not feature small clusters with a high $U_{core}^R$. This is because the algorithm of the present invention rejects clusters that would result in a unacceptable high hardware effort (due to factor "F", line 13 in FIG. 2). This example is included to point out that the minimization of energy dissipation is a difficult task.

As a result of the present invention, tremendous energy savings can be achieved for DSP oriented applications with a small hardware overhead and in most cases even reduce execution time (i.e. increase performance).

The low power partitioning approach for core-based systems of the present invention is very comprehensive since it takes into consideration a whole system consisting of a standard off-the-shelf processor core, an ASIC core, caches and main memory. In addition, an important advantage against other low power system-level design approaches is that it can achieve tremendous energy savings of up to 94% at relatively low additional (hardware) costs. This has been possible since the methodology uses the idea of evaluation a utilization rate $U_{core}^{R}$ at the operator-level, thus allowing to select efficient clusters.

Furthermore, the present invention is tailored especially to computation and memory intensive applications like those found in economically interesting mobile devices like cell phones, digital cameras etc.

Additional advantages and modifications will readily occur to those skilled in the art. Therefore, the invention in its broader aspects is not limited to the specific details shown and described herein. Accordingly, various modifications may be made without departing from the spirit or scope of the general inventive concept as defined by the appended claims and their equivalents.

What is claimed is:

1. A method of optimizing a system for power usage, said system having a set of cores, with each of said set of cores having a plurality of functional units, comprising the steps of:

calculating a utilization rate of each of said functional units and each of said cores, where the utilization rate of each of said functional units is defined as a number of clock cycles said functional unit is actually performing an operation in relationship to all clock cycles this functional unit is switched on, and the utilization rate of each of said cores is defined as the average utilization rate of all of said functional units;

selecting cores from said set of cores that have a low utilization rate and dividing functions of those selected cores into partitioning objects;

executing said partitioning objects and calculating utilization rates for said executed partitioning objects;

comparing the utilization rates of the partitioning objects with the utilization rates of the selected cores from which the partitioning objects were extracted;

synthesizing said partitioning objects for which the utilization rates of the partitioning objects is lower than the utilization rates of the selected cores from which the partitioning objects were extracted, where said synthesized partitioning objects represent new cores to be added to the system as small ASICs; and building said system using said new cores and some of said cores from said set of cores.

2. The method of claim 1, further comprising a step of determining said functional units of said cores by examining code segments that make up a set of operations of said cores.

3. The method of claim 2, wherein said step of determining said functional units includes a step of pre-selecting some of said functional units that are expected to yield energy savings based on bus transfers between a main memory of the system and cores corresponding to some of said functional units.

4. The method of claim 1, wherein said method takes into consideration all of said cores, caches and a main memory of said system to minimize power usage of the entire system.

5. The method of claim 1, wherein said new cores are executed in the built system in mutual exclusion of said selected cores from which the new cores were extracted.

6. The method of claim 1, wherein the system is optimized by producing an energy saving while maintaining or increasing the performance of the system as compared to an initial, unoptimized design of the system.

* * * * *